United States Patent [19]
Wilcox et al.

[11] Patent Number: 6,045,470
[45] Date of Patent: Apr. 4, 2000

[54] FRONT DERAILLEUR WITH CHAINLINE CONTROLLING IDLER COG

[75] Inventors: Weston M. Wilcox, Sun Prairie; Stephen J. Baumann, Oconomowoc, both of Wis.

[73] Assignee: Trek Bicycle Corporation, Waterloo, Wis.

[21] Appl. No.: 09/135,280

[22] Filed: Aug. 17, 1998

Related U.S. Application Data

[60] Provisional application No. 60/073,974, Feb. 6, 1998.

[51] Int. Cl.[7] .................................................. F16H 9/00
[52] U.S. Cl. .................................. 474/78; 474/80; 474/69
[58] Field of Search ................................. 474/80, 82, 81, 474/78, 69, 50; 280/284, 274, 283, 275, 285, 288.3

[56] References Cited

U.S. PATENT DOCUMENTS

| | | |
|---|---|---|
| 4,002,080 | 1/1977 | Huret et al. .............................. 74/217 B |
| 4,199,997 | 4/1980 | Isobe ...................................... 74/217 B |
| 4,223,562 | 9/1980 | Nagano et al. ............................ 474/82 |
| 4,279,605 | 7/1981 | Egami ........................................ 474/82 |
| 4,362,522 | 12/1982 | Huret ........................................ 474/82 |
| 4,599,079 | 7/1986 | Chappell .................................... 474/80 |
| 4,701,152 | 10/1987 | Dutil et al. ............................ 474/80 X |
| 5,284,354 | 2/1994 | McWethy ................................ 280/284 |
| 5,358,451 | 10/1994 | Lacombe et al. ..................... 474/80 X |
| 5,599,244 | 2/1997 | Ethington .................................. 474/70 |
| 5,685,553 | 11/1997 | Wilcox et al. .......................... 280/283 |

*Primary Examiner*—David A. Bucci
*Assistant Examiner*—Marcus Charles
*Attorney, Agent, or Firm*—Lee, Mann, Smith, McWilliams, Sweeney & Ohlson

[57] ABSTRACT

A front derailleur for shifting gears on a chain driven bicycle, the chain having a drive run and a return run from a plurality of chainwheels, uses a chain supporting idler cog to vertically control the chainline of the chain drive run and to also move transversely to shift the chain from one of the chainwheels to another.

12 Claims, 4 Drawing Sheets

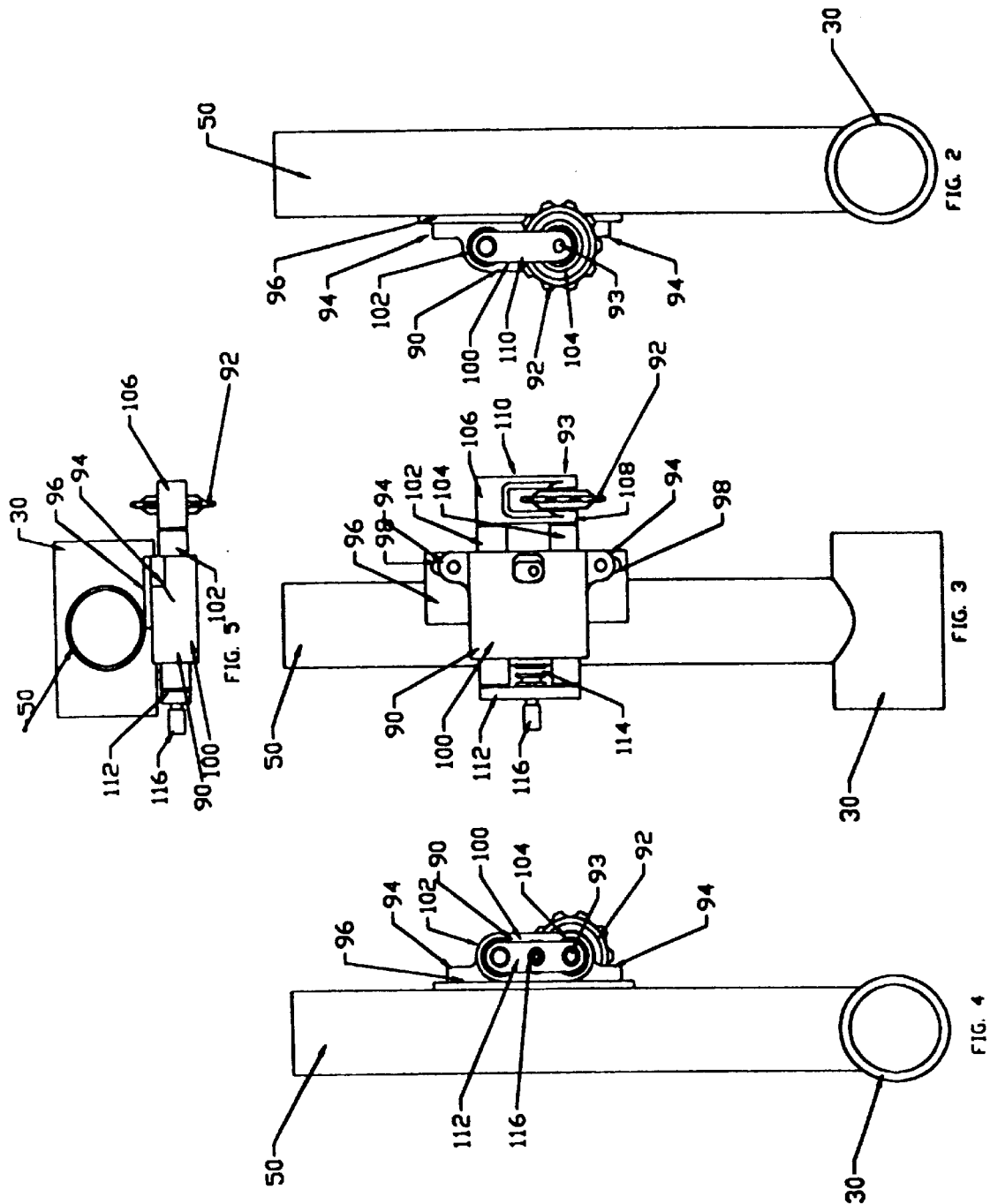

FRONT DERAILLEUR WITH CHAINLINE CONTROLLING IDLER COG

CLAIM OF PRIORITY

Applicants claim priority based on Provisional patent Application Ser. No. 60/073,974, filed Feb. 6, 1998 and entitled "Front Derailleur With Chainline Controlling Idler Cog".

BACKGROUND OF THE INVENTION

1. Field of the Invention

The invention is a dual purpose bicycle chainline control using an idler cog mounted preferably in connection with a pivoting bicycle rear suspension so as to control chainline in both vertical and transverse directions thereby eliminating both chain movement induced by suspension movement and suspension movement induced by pedaling and other rider induced movement. The transverse directional control enables the idler cog to function as a high precision derailleur enabling greater flexibility in the size and range of front chainwheels on a bicycle.

2. Description of Related Art

The prior art includes three categories of devices. First are chainline and chain protection devices which are occasionally fitted to bicycles such as "mountain bikes" to prevent chains from disengaging from the chainwheels during the forceful and repetitive impact induced particularly during downhill mountain bike riding and racing. These include a variety of clips and guards, occasionally adapting rear derailleur chain tensioner pulleys or cogs to locations above and below the "normal" longitudinal chainline. These are used to provide some level of control to retain the chain against chain throw, slap and suck, these being, respectively, the chain being thrown off the chainwheel, the chain moving rapidly in a direction generally perpendicular to its axis and the lower, return run becoming overridden by the drive run.

The second major category of related art is the derailleur art. These include front derailleurs and rear derailleurs. Front derailleurs have typically simply involved a front derailleur cage having side pieces or plates that simply force a chain transversely from one chainwheel to an adjacent chainwheel on a front crank assembly typically having two or three very large chainwheels. Contact with the chain is not only not anticipated but in fact would be an indication of improper adjustment. Various art uses cage shape and pivot arrangements to minimize contact between the cage and the chain which may affect vertical chainline. The front derailleur is typically located in a position above the front chainwheel and operates to deflect the drive run or upper portion of the chain.

Rear derailleurs have been used to move a chain transversely by deflecting the return or unloaded lower run of the chain. Rear derailleurs are typically mounted in a position near and below the position of their axle of the rear wheel of a bicycle. Typically the rear derailleur moves transversely using a lever pivotally mounted on the derailleur itself, linkage or combination of these to force the chain in a transverse direction inwardly or outwardly to engage from about five to up to about eight or nine different sprockets on a rear freewheel or free hub which enables coasting while not pedaling.

As the rear derailleur is below the line between the rear axle and the bottom bracket around which the pedals crank, and is associated with the return run or lower unloaded run of the chain, coupled with the fact that the variation in size of rear sprockets and front chainwheels, in combination with varied shifting patterns, would normally require a different length of chain, the slack, the rear derailleur cage typically includes a pivoting cage having two pulleys or cogs, being spring loaded to take up chain tension. This is accomplished, however, on the unloaded return run of the chain.

Third, certain prior art has used cogs bearing on the drive run of a bicycle chain for the purpose of sensing load on the chain. Typically these load sensors are used in "automatic" shifting on bicycles. These embodiments use a cog which reacts to vertical chainline and does not control it.

SUMMARY OF THE INVENTION

As bicycles of the "mountain bike" category have become more and more popular and have evolved consistent with the expansion of both recreational and competition riding, development of full suspension mountain bikes has become increasingly important. A full suspension mountain bike typically involves a front fork having a suspension arrangement and a pivoting rear suspension, widely varying geometries being used. This invention addresses particular needs arising from the relationship between a pivoted rear suspension and the drive chain by which the rider imports motive force to the rear wheel.

Important considerations in a pivoting rear suspension include the direction and speed of the vertical and horizontal components of rear wheel movement; the relationship of that movement to the forward movement of the bicycle; the crest of curvature of the arc or other geometric figure subscribed by the rear axle and the axis or axes around which said rear wheel movement takes place. A key factor in suspension operation is the relationship of the aforementioned suspension movement to the bicycle drive train.

Bicycle drive trains typically rely on a rotational force on pedals, through crank arms to chainwheels, thence through a chain drive run to a rear wheel sprocket, which rotates the rear wheel. This rotational force, imparted by the movement of and load on the pedals transmitted by the rider can affect movement of and load on (hence performance of) the suspension. Similarly, movement of the rear wheel can affect drive on the wheel, tension or slack condition on the chain. This is further complicated by the use of multiple diameter chainwheels. This causes a variation in the direction of chain force relative to the rear swing arm pivot.

An efficient solution to minimizing certain of these problems has been achieved by our U.S. Pat. No. 5,685,553, issued Nov. 11, 1997. This patent teaches a unified rear triangle and is incorporated by reference herein. When the bottom bracket and rear wheel axle are in fixed relationship to one another, they eliminate many of the rear wheel motion/chain-to-chainwheel relative motion problems. However, the unified rear triangle still can have relative motion as a result of movement transmitted to the rider because the crank arm, fixedly attached to the bottom bracket, contacts the rider's foot through the pedals, while the rider is seated or otherwise associated with the main frame and front wheel through the seat and/or handlebars. Thus, relative motion of the unified rear triangle to the main frame can transmit force to the rider through the pedal. Similarly, the rider can transmit somewhat of a rotational force to the unified rear triangle by pedaling. The invention addresses these problems by providing for a highly controlled chainline additionally replacing the conventional front derailleur.

The invention provides for control of the drive run of a bicycle chain using a chain supporting idler cog. Preferably, the chain supporting idler cog moves transversely with reciprocating shafts so as to enable shifting of the chain from large to small chainwheels and vice versa, thereby both having adequate strength to support the load on the chain while additionally performing the function of a front derailleur. In an alternative improved embodiment, vertical travel is also adjustable. This could be by manual adjustment to a fixed point by a mechanic or even through a linkage adjustable by the rider while riding to obtain customized performance.

This idler cog provides a chain-wheel-size neutral position for the chainline relative to the vertical position of a suspension pivot. Thus, rotational movement imparted on the suspension as a result of pedaling will be consistent regardless of the chainwheel on which the chain is engaged. The position can also be optimized for the most neutral position, preferably substantially along a line from the point where the chain departs from the rear sprocket to the center of the pivot, or may also be varied for particular riding conditions. Thus, a downhill racing bicycle may have the chainline optimized in one position while a cross country mountain bicycle could have the chainline in a slightly different position.

Other conditions are also potentially controllable through movement in a vertical or near vertical direction of the idler cog. For example, riders shifting weight under certain circumstances may change rear wheel loading rendering it desirable to raise or lower the chainline. Another consideration is the loading on the idler cog and related structure itself. When the primary chain run on the chainwheel side of the idler cog is somewhat parallel to the drive run aft of the idler cog, the loads on the idler cog will not be substantial, however, as the angle increases, the load increases dramatically. Thus, depending on the longitudinal position of the idler cog, it may be desirable to lower the vertical position to minimize load on the cog, bearings, supporting structure, and to reduce the friction thereon.

BRIEF DESCRIPTION OF THE DRAWINGS

The following drawings, in which like reference characters indicate like parts, are illustrative of embodiments of the invention and are not intended to limit the scope of the invention in any manner whatsoever, as encompassed by the claims forming a part hereof.

FIG. 2 is a right side elevational view of a portion of a pivoted rear triangle with the invention in place.

FIG. 3 is a rear elevational view of a portion of a pivoted rear triangle with the invention in place.

FIG. 4 is a left side elevational view of a portion of a pivoted rear triangle with the invention in place.

FIG. 5 is a top plan view of a portion of a pivoted rear triangle with the invention in place.

DETAILED DESCRIPTION OF THE PREFERRED EMBODIMENT

Figure 1:
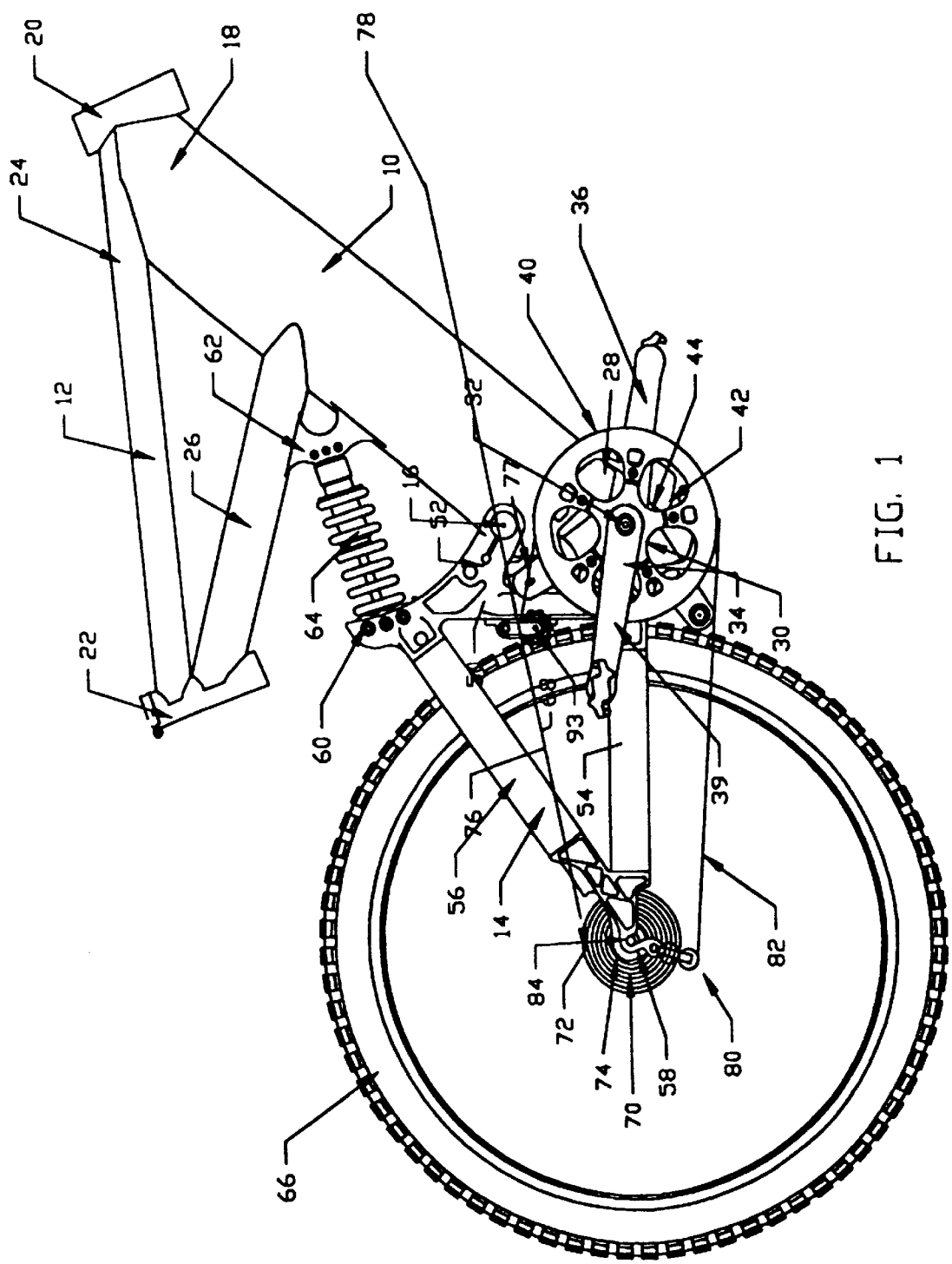
FIG. 1 is an right side elevational view of a bicycle main frame and pivoted rear triangle having the invention in place.

A bicycle frame assembly 10 comprises a main frame 12 and rear triangle 14, the rear triangle being pivoted from frame 12 at pivot 16.

In this preferred embodiment main frame 12 comprises main tube 18, head tube 20, seat tube 22, top tube 24 and a seat tube support tube 26. Pivot 16 is mounted on the lower half of main tube 18 while at the, or substantially near the lowest end 28 is mounted bottom bracket 30.

Mounted to bottom bracket 30 is bottom bracket spindle 32 around which crank assembly 34 rotates. Crank assembly 34 includes crank arms 36, 39 and chainwheels 40, 42, 44 of decreasing size (diameter and number of teeth) and, accordingly, lower effective gear ratio. Rear triangle 14 incorporates brace 50 incorporating flange 52 and its mirror image on the opposite side which engage pivot 16. Chainstay 54 and upper stay 56 extend rearwardly from brace 50 joining at dropout 58, corresponding elements being on the opposite side of the bicycle in a substantially conventional form. Rear triangle shock mount 60 and frame shock mount 62 have a shock absorber 64 having hydraulic, pneumatic, elastomeric or spring actuation or a combination of these as is known in the art.

It will be noted that frame 18 can be seen to have a generally Y-shaped configuration, with the shock absorber mount 62 at the intersection of the Y. A variety of other configurations and linkages that enable shock mounting and travel could also be used, and the invention is not limited to any particular frame configuration.

Motive force from crank assembly 34 to wheel 66 is provided through chain 68 acting on rear sprocket assembly 70. Rear sprocket assembly 70 will typically be a standard free hub or free wheel assembly, typically having between five and up to about nine separate sprockets of graduated size typically measured by the number of teeth. The largest rear sprocket may typically have a number of teeth the same or larger than the smallest front sprocket 44 thereby providing mechanical advantage on a lower than 1:1 gear ratio for hill climbing.

The small rear sprocket 74 when driven by the large chainwheel 40 provides a higher gear ratio enabling a fairly high speed over ground with relatively comfortable crank cadence or revolutions per minute, more suitable for flat terrain or accelerating downhill. When chain 68 and particularly drive run 76 are in configurations such as those described or those intermediary combinations run 76 describes a chainline 78 generally corresponding to the longitudinal axis of frame assembly 10. However, the drive end of run 76 is always at a substantially fixed location relative to pivot 16 and spindle 32. Indeed, the variation in run 76 with gear changes is very slight. As a result, the force on the suspension imposed by pedaling loads is substantially consistent throughout the full range of gears.

Cog 92 also provides control over primary chain drive run 77 from front sprockets or chainwheels 40, 42, 44 to cog 92. The load on this run 77 is similarly insulated from any substantial effect on rear triangle 14 because of the consistent position of cog 92. Neither rider induced loads on the chain 68 will affect the suspension, nor will movement of the suspension substantially affect the load on the rider's pedals.

Figure 7:
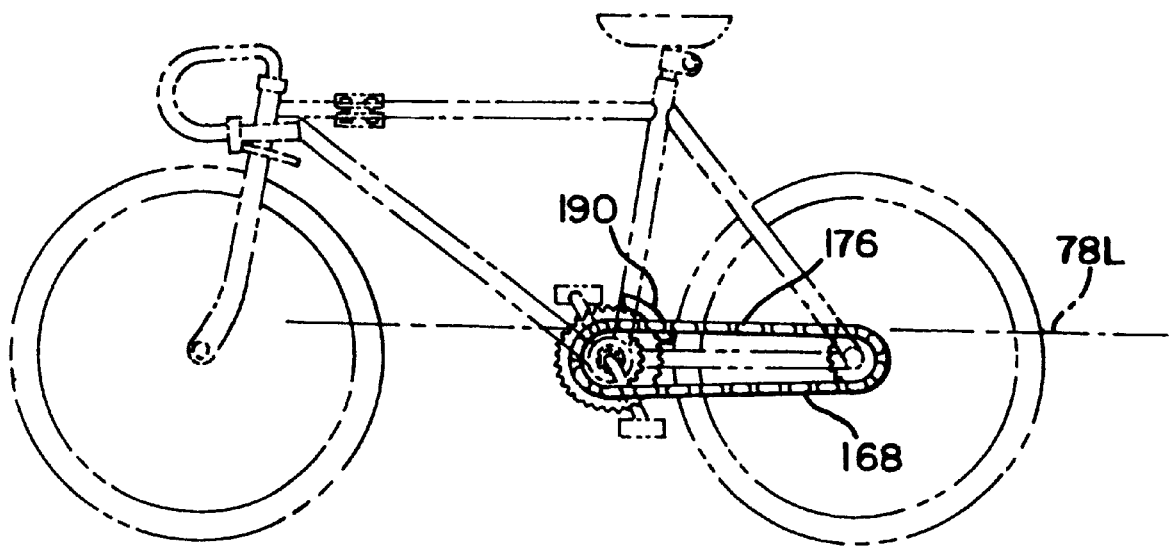
FIG. 7 is an elevational view of a prior art derailleur equipped bicycle in low gear.
Figure 8:
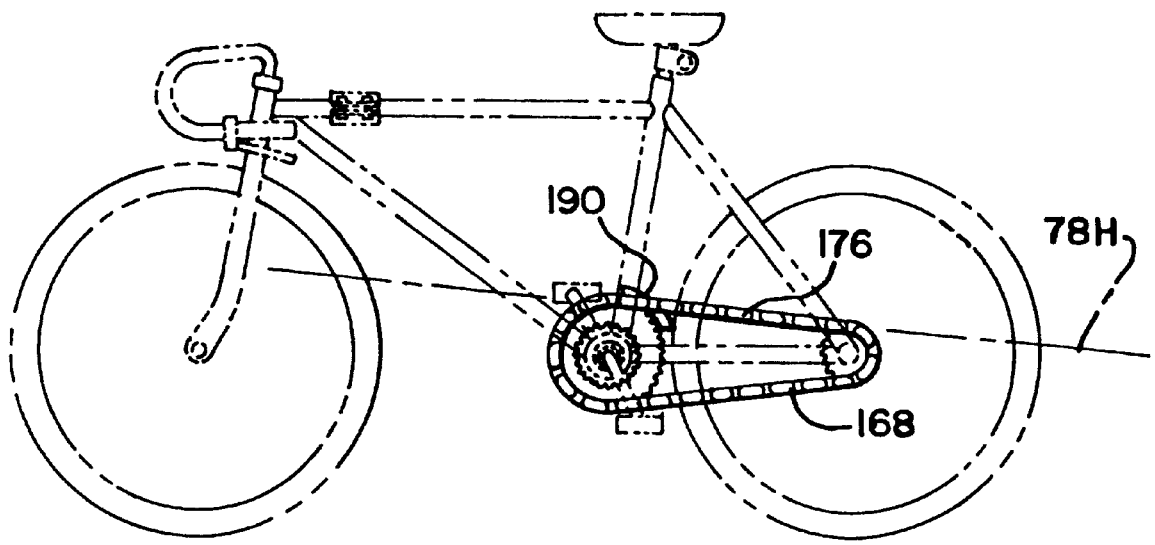
FIG. 8 is an elevational view of a prior art derailleur equipped bicycle in high gear.

The advantage of chainline control is illustrated by comparison to the prior art, as in FIGS. 7 and 8. As chain 168 engages different combinations of front chainwheels and rear sprockets the chainline, 78L in FIG. 7 and 78H in FIG. 8, varies in slope from the horizontal. Thus, chainline 78H will have a pronounced downward slope (from rear to front) when in the lowest gear while 78L will have a upward slope when in certain gear combinations. The prior art of FIG. 7 and FIG. 8, if adapted to a suspension bicycle (these are non-suspension or "hard tail" bicycles, for clarity of illustration) would result in differential directional components in different gears, and therefore would impose differential loads on the pivoting suspension.

The critical factor is not the low and high gear ratios themselves, which customarily vary in different combinations. The critical factor in a suspension bicycle is the consistent location of chainline 78 (FIG. 1) as compared to the highly variable chainlines 78L or 78H (FIGS. 7 and 8). In the invention chainline 78 does not vary substantially from its position relative to spindle 32 and pivot 16. Because of this consistency, the directional component of the load on the pivoting rear suspension is always substantially the same.

The foregoing impact of chainline position becomes particularly more important on a bicycle having a rear triangle 14 pivoted from the main frame 12 because the relative movement tends to lengthen or reduce the distance between the point of tangency of chain drive run 176 and the respective front chainwheel and rear sprocket. These differential loads are difficult to control and are undesirable. In addition to the loss of effective performance of the suspension, forward thrust can be diminished in an unwanted manner and the rider's balance and weight distribution adversely affected. The key dimensional relationship in the invention is the location of idler cog 92 relative to pivot 16. The axle 93 around which cog 92 rotates is generally along a line from pivot 16 to the mean position of axle 84. Of course, axle 84 moves under rider weight in addition to suspension reaction to the ground when the bicycle is ridden, so the actual line moves fairly constantly.

In addition to the advantageous transmission of power from the rider into forward thrust, with minimizing adverse effects thereby on the pivoted suspension, the transmission of loads from the riding surface to the rider is also advantageously affected by the invention. As rear wheel 66 hits a rock, stump, pot hole or other obstruction rear triangle 14 will be deflected upward around pivot 16, thereby lengthening the spindle-rear axle line segment 32–84.

Thus, the invention's cog 92 provides a fixed point around which consistent chainline 78 corresponding to drive run 76 and a second substantially consistent chain primary run 77 provide their load. This consistent, fixed point negates any effect of motion of rear triangle 14 relative to main frame 12 around pivot 16 on the effective drive run length, and negates both the impact of rider loads on the suspension and suspension loads fed back to the rider. Significant loads are imposed on the mechanism as compared to ordinary front derailleurs and the strength to handle these loads as well as the demands imposed by the additional functions upon which the mechanism is called to perform. Because of the complexity of the mechanism in controlling gear shifting this invention will be described more fully with reference to the other figures.

Gear shifting at the rear is typically controlled by a standard rear derailleur 80. Rear derailleur 80 includes both transverse movement and a chain tensioning function whereby slack in the return run 82 of chain 68 will be taken up sufficiently that chain 68 will not normally fall off sprockets 40–44, 70–74. It has been discovered, however, that under the more pronounced forces imparted in aggressive mountain biking greater control is necessary.

Because the chainwheels, as shown, are spaced below pivot 16, on the ordinary derailleured suspension bicycle, drive run 76 would also be lengthened. This, then, would impart a change in the rotational moment of wheel 66, load on crank arms 36, 38 as well as, on rebound, slack in drive run 72. When coupled with continued pedaling or even slight rotation of crank assembly 34 to maintain balance or the like, there is risk of the chain being thrown from a sprocket, risk that the slack chain can become wound around itself on the sprocket, following, or other unwanted action.

Figure 6:
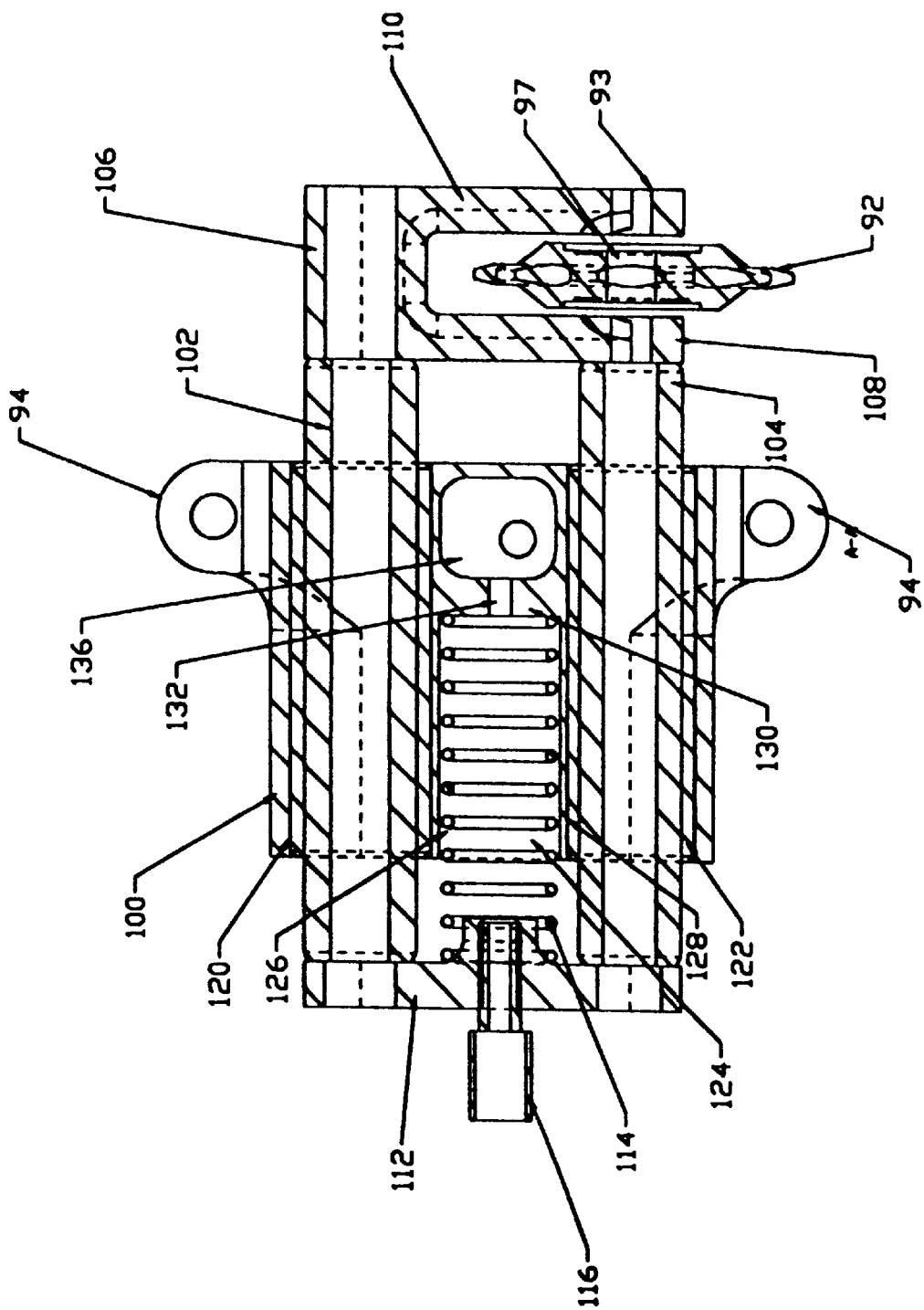
FIG. 6 is a sectional view of the front derailleur with chainline control.

As shown in FIGS. 4–6, front derailleur 90 with chainline controlling idler cog 92 is rotatably carried on axle 93 in with flanges 94 to brace boss 96. While a bushing 97 is shown, bearings or other friction reducing arrangements could be used. In the preferred embodiment vertical adjustment of front derailleur 90 is provided by bolting through slots 98 in boss 96. When the bolts or other fasteners, known to one of ordinary skill, are tightened, vertical movement is not permitted because of the compression of the bolt against the flange 94 with boss 96 captured therebetween. As the bolts are loosened, front derailleur 90 can be vertically repositioned for the optimum vertical chainline, relative to pivot 16 and chainwheels 40, 42, 44. Flanges 94 extend outwardly from derailleur body 100.

Derailleur body 100 supports two shafts, upper shaft 102 and lower shaft 104, for transverse, reciprocating movement therein. This movement serves to align cog 92 with a selected chainwheel 40, 42, 44, the chainwheels being transversely spaced from one another in the conventional manner.

Cog 92 is supported at the cog end of shafts 102, 104 by clevis assembly 106 between inner plate 108 and outer plate 110. Opposite the cog end of shafts 102, 104, the shafts 102, 104 are joined by control plate 112.

Control plate 112 receives spring 114 which is compressed for outward transverse movement of cog 92 by the action of control cable received in control cable barrel 116. Control cables are known to those in the bicycle art, certain aspects being described, for example, in U.S. Pat. No. 4,279,605 incorporated by reference herein. The cable is the preferred tensioner acting against the pressure of spring 114 to move the mechanism for use as a shifting derailleur. Barrel 116 can be the conventional style having a recess receiving a sheathed bicycle control cable and a threaded portion engaging plate 112 permitting fine adjustment of cable tension by rotating the threaded barrel.

The key to operation of the invention is the vertically fixed mounting of body 100 and the load bearing cog 92 which bears the downward component of loads on the chain imparted by any change in direction of the vertical chainline so that the chain pedaling loads can be transmitted with a neutral effect on any pivoting rear axle. The solid construction of clevis assembly 106 with shafts 102, 104, through body 100 and utilizing plate 112 enables a very strong structure, while further enabling very precise control of the transverse position of cog 92.

By comparison, the common type of derailleur 190, as used in FIGS. 7 and 8 merely use side plates to actually contact and force the chain transversely. This form has long been known to one of ordinary skill. The prior art front derailleur side plates are joined by a crosspiece that does not desirably contact the chain and in fact merely connects the two side plates. Because of this structure, prior art front derailleurs are fairly imprecise, particularly for wide ranges of chainwheel sizes, because of the extended length needed for the side plates. Thus, prior art front derailleurs are unsuitable to controlling the vertical chainline, and because the only contact the chain when shifting, do little to actually control the chain. The invention not only provides advantages to custom adjust vertical chainline to a pivoted rear triangle, but also supports the chain to reduce unwanted throw, slap and suck, and provides very precise control of the transverse position of the chain for improved shifting.

Thus, the improved front derailleur design has advantages on "hard tail" or fixed rear triangle mountain bikes and even on road bikes where control of pedaling loads can permit advantageously lighter, optimized cross section chainstays and seatstays in the rear triangle. As chains become narrower to permit more rear sprockets in a given dimension, improved precision in shifting and control is also more desirable.

It can be seen that in section shafts 102, 104 can be made as hollow tubes enabling through-bolting of the entire structure of clevis 106, shaft 102, 104, and control plate 112. Shafts 102, 104 can preferably be carried in bushings 120, 122. Body 100 can be formed, as by machining, to include spring retainer recess 124 defined by side walls 126, 128 and end wall 130. Wall 130 is relieved to have a cable passage 132 to enable the control cable to pass to cable anchor 136. Thus, as the conventional shift lever is activated, the clevis 106 and cog 92 are forced outward (to the right in this drawing) to shift the chain to a larger, higher chainwheel 42, 33, or cable tension is released, the spring 114 forcing the clevis 106 and cog 92 to a smaller, lower chainwheel 40, 42, depending on the chainwheel of origin.

In the currently preferred embodiment, cog 92 is of substantially the same construction as a high performance rear derailleur cog. These may be, for example, bushed or run on roller or ball bearings. The materials used can be plastics with high performance mechanical properties, or selected metals such as aluminum, titanium or other light alloys. It will be recognized that the load on the cog 92 is, or may be, substantially greater than a rear derailleur's return run idler cog, and accordingly the properties of cog 92 will need to be optimized to high load conditions.

In addition to the vertically fixedly mounted but manually adjustable embodiment described herein, adjustable by loosening, repositioning and retightening mounting bolts, a vertically shiftable front derailleur may provide significant advantages. A rider, particularly of a full suspension bike, could customize chainline relative to rear triangle pivot location. A rider could also adjust load on the cog, hence friction, to certain ride conditions. Suitable mechanisms include thumbscrew or "dialable" adjustments at the derailleur using a threaded rod to control vertical position of body 100 relative to a track or carrier mounted directly to boss 96, a simple detented cam offering high and low position, or even a "power take-off" using a separate engageable drive unit for adjustment while actually riding.

As many and varied modifications of the subject matter of this invention will become apparent to those skilled in the art from the detailed description given hereinabove, it will be understood that the present invention is limited only as provided in the claims appended hereto.

In accordance with our invention, we claim:

1. In a derailleur for shifting gears on a chain driven bicycle, with the chain having a drive run and a return run from a plurality of chainwheels rotating about an axis:
   a chainline vertical control supporting the chainline of the chain drive run in a vertically fixed position relative to said axis;
   the chainline vertical control selectably shifting said chain between said chainwheels.

2. The chainline vertical control of claim 1 further comprising a body rotatably supporting an idler cog on an axle, said cog, axle and body bearing the vertical loads imposed by said drive run.

3. The chainline vertical control of claim 2 further comprising a shifting mechanism wherein said cog shifts in an axial manner to derail and engage said chain between said chainwheels.

4. A chainline vertical control adapted to shifting gears on a chain driven bicycle, with the chain having a drive run and a return run from a plurality of chainwheels rotating about an axis comprising:
   said chainline vertical control supporting the chainline of the chain drive run in a vertically fixed position relative to said axis;
   the chainline vertical control selectable shifting said chain between said chainwheels;
   a body rotatably supporting an idler coo on an axle, said cog, axle and body bearing the vertical loads imposed by said drive run;
   a shifting mechanism wherein said cog shifts in an axial manner to derail and engage said chain between said chainwheels;
   said shifting mechanism further comprising a spring urging said cog to engage said chain on an inner chainwheel and a tensioner acting directly against the pressure applied by said spring to urge said cog to engage said chain on an outer chainwheel.

5. The chainline vertical control of claim 4 further comprising
   said body formed to slidably receive a shaft;
   said shaft supporting an assembly;
   said assembly supporting said axle.

6. The chainline vertical control of claim 5 being mounted to a front wheel and rider supporting frame;
   a rear wheel supporting suspension pivotally connected to said frame, said chainline vertical control maintaining said chainline position substantially independently of relative movement of said suspension and frame.

7. The chainline vertical control of claim 6 further comprising a shifting mechanism wherein said cog shifts in an axial manner to derail and engage said chain between said chainwheels.

8. A chainline vertical control adapted to shifting gears on a chain driven bicycle, with the chain having a drive run and a return run from a plurality of chainwheels rotating about an axis comprising:
   the chainline vertical control supporting the chainline of the chain drive run in a vertically fixed position relative to said axis;
   said vertically control selectably shifting said chain between said chainwheels;
   a body rotatably supporting an idler cog on an axle, said cog, axle and body bearing the vertical loads imposed by said drive run;
   a shifting mechanism wherein said coo shifts in an axial manner to derail and engage said chain between said chainwheels;
   said shifting mechanism further comprising a spring urging said cog to engage said chain on an inner chainwheel and a tensioner acting directly against the pressure applied by said spring to urge said coo to engage said chain on an outer chainwheel
   said body formed to slidably receive a shaft;
   said shaft supporting an assembly;
   said assembly supporting said axle;
   the chainline vertical control being mounted to a front wheel and rider supporting frame;

a rear wheel supporting suspension pivotally connected to said frame, said chainline vertical control maintaining said chainline position substantially independently of relative movement of said suspension and frame;

the chainline vertical control further comprising a shifting mechanism wherein said cog shifts in an axial manner to derail and engage said chain between said chainwheels;

said shifting mechanism further comprising a spring urging said cog to engage said chain on an inner chainwheel and a tensioner acting directly against the pressure applied by said spring to urge said cog to engage said chain on an outer chainwheel.

9. A chainline control for a bicycle having a chainwheel driving an endless flexible drive member and the member driving a sprocket operatively connected to a drive wheel comprising:

a support body;

an idler;

the flexible drive member having a drive run;

said idler supporting said drive run under load such that variations in the vertical position of said run are minimized while said bicycle is operated;

said chainwheel being a first chainwheel and the bicycle having a second chainwheel operatively connected with said first chainwheel for changing drive gear ratios by shifting the chain therebetween;

said sprocket being a first sprocket and the bicycle having a second sprocket operatively connected with said first sprocket for changing drive gear ratios by shifting the chain therebetween;

said vertical position of said run being substantially isolated from variation as a result of shifting of gear ratios;

said shifting between said first and second chainwheels being accomplished by operation of said chainline control;

said shifting between the first and second chainwheels being further accomplished by the axial movement of said idler;

said support being mounted to said frame;

said idler being rotatably carried in a clevis;

said clevis being shiftably supported in said support by a shaft;

said shaft being transversely movable to accomplish said axial movement of said idler.

10. A chainline control for a bicycle having a chainwheel driving an endless flexible drive member and the member driving a sprocket operatively connected to a drive wheel comprising:

a support body;

an idler;

the flexible drive member having a drive run;

said idler supporting said drive run under load such that variations in the vertical position of said run are minimized while said bicycle is operated said bicycle having a steerable wheel supported by a frame;

said bicycle having said drive wheel supported by a suspension;

said suspension being pivotally connected to said frame;

said vertical position of said run being substantially isolated from variation as a result of relative movement between said frame and suspension;

said chainwheel being a first chainwheel and the bicycle having a second chainwheel operatively connected with said first chainwheel for changing drive gear ratios by shifting the chain therebetween;

said sprocket being a first sprocket and the bicycle having a second sprocket operatively connected with said first sprocket for changing drive gear ratios by shifting the chain therebetween;

said vertical position of said run being substantially isolated from variation as a result of shifting of gear ratios;

said shifting between said first and second chainwheels being accomplished by operation of said chainline control;

said shifting between said first and second chainwheels being further accomplished by the axial movement of said idler;

said support being mounted to said frame;

said idler being rotatably carried in a clevis;

said clevis being shiftably supported in said support by a shaft;

said shaft being transversely movable to accomplish said axial movement of said idler.

11. A vertical chainline controlling derailleur for a bicycle having a frame, chainwheels and a sprocket set driving a wheel through a chain drive run describing a vertical chainline comprising:

a body fixed on said frame;

a plurality of shafts transversely slidably carried in said body;

a clevis mounted on said shafts and being transversely movable with the shafts;

an idler cog rotatably mounted on an axle, the axle being carried in said clevis having transverse movement enabled by said clevis movement;

said drive run being vertically supported by said cog while said cog is under load and said transverse movement accomplishing the shifting of gear ratios on said chainwheels.

12. The chainline controlling derailleur of claim 11 further comprising:

said drive wheel being supported by a suspension;

said suspension being pivotally mounted to said frame;

said vertical chainline being substantially isolated from suspension movement.

* * * * *